United States Patent
Hwang et al.

(10) Patent No.: US 10,236,941 B2
(45) Date of Patent: Mar. 19, 2019

(54) SINGLE ANTENNA-BASED WIRELESS CHARGING AND NEAR-FIELD COMMUNICATION CONTROL APPARATUS AND USER TERMINAL THEREFOR

(71) Applicant: Maps, Inc., Yongin-si (KR)

(72) Inventors: Jong Tae Hwang, Seoul (KR); Ki-Woong Jin, Anyang-si (KR); Sung Min Park, Seoul (KR); Min Jung Ko, Seoul (KR); Dong Su Lee, Dongducheon-si (KR); Jong Hoon Lee, Seongnam-si (KR); Hyun Ick Shin, Seoul (KR); Joon Rhee, Seoul (KR)

(73) Assignee: Maps, Inc., Yongin-si (KR)

( * ) Notice: Subject to any disclaimer, the term of this patent is extended or adjusted under 35 U.S.C. 154(b) by 0 days.

(21) Appl. No.: 15/769,955

(22) PCT Filed: Nov. 1, 2016

(86) PCT No.: PCT/KR2016/012418
§ 371 (c)(1),
(2) Date: Apr. 20, 2018

(87) PCT Pub. No.: WO2017/086628
PCT Pub. Date: May 26, 2017

(65) Prior Publication Data
US 2018/0323828 A1    Nov. 8, 2018

(30) Foreign Application Priority Data

Nov. 16, 2015 (KR) .................. 10-2015-0160684
Dec. 8, 2015 (KR) .................. 10-2015-0174283

(51) Int. Cl.
*H04B 5/00* (2006.01)
*H04B 1/40* (2015.01)
(Continued)

(52) U.S. Cl.
CPC ............ *H04B 5/0037* (2013.01); *H02J 7/025* (2013.01); *H04B 5/0031* (2013.01)

(58) Field of Classification Search
CPC ...... H02J 7/00; H02J 7/02; H02J 50/12; H02J 50/80; H02J 50/10; H04B 5/00; H04B 5/0031; H04B 5/0037; H01Q 7/00
See application file for complete search history.

(56) References Cited

U.S. PATENT DOCUMENTS 9,030,052 B2    5/2015  Kim et al.
9,356,475 B2 *  5/2016  Kim .................. H02J 17/00
(Continued)

FOREIGN PATENT DOCUMENTS

KR    10-2012-0128546 A    11/2012
KR    10-2013-0053856 A    5/2013
(Continued)

OTHER PUBLICATIONS

International Search Report dated Jan. 26, 2017 in corresponding International Patent Application No. PCT/KR2016/012418 (2 pages in English, 3 pages in Korean).
(Continued)

*Primary Examiner* — Blane J Jackson
(74) *Attorney, Agent, or Firm* — NSIP Law

(57) ABSTRACT

Disclosed are a single antenna-based wireless charging and near field communication control apparatus and a user terminal therefor. A single antenna-based wireless charging and near field communication control apparatus according to one embodiment comprises: a switch control unit for detecting a resonance frequency from an input signal of a rectifier in a power receiver and determining whether the detected resonance frequency is a first frequency for wireless charging using a single antenna or a second frequency for near field communication using a single antenna, to generate a
(Continued)

control signal; and a switch which is turned on/off for wireless charging or near field communication according to the received control signal from the switch control unit.

7 Claims, 8 Drawing Sheets

(51) Int. Cl.
*H02J 50/10* (2016.01)
*H01Q 7/00* (2006.01)
*H02J 7/02* (2016.01)

(56) References Cited

U.S. PATENT DOCUMENTS

| | | | |
|---|---|---|---|
| 9,461,364 | B2 | 10/2016 | Lee et al. |
| 9,590,446 | B2 * | 3/2017 | Park ........................ H02J 7/025 |
| 9,742,473 | B2 | 8/2017 | Kim et al. |
| 2013/0113422 | A1 | 5/2013 | Lee et al. |
| 2014/0327390 | A1 | 11/2014 | Park et al. |
| 2016/0241087 | A1 * | 8/2016 | Bae ........................ H02J 50/12 |
| 2016/0308401 | A1 | 10/2016 | Lee et al. |
| 2017/0338697 | A1 | 11/2017 | Lee et al. |
| 2017/0338861 | A1 | 11/2017 | Kim et al. |

FOREIGN PATENT DOCUMENTS

| | | |
|---|---|---|
| KR | 10-1327081 B1 | 11/2013 |
| KR | 10-2014-0131428 A | 11/2014 |
| KR | 10-2015-0028042 A | 3/2015 |

OTHER PUBLICATIONS

Korean Notice of Allowance dated May 18, 2017 in Korean Patent Application No. 10-2015-0174283 (15 pages in Korean).
Korean Office Action dated May 18, 2017 in Korean Patent Application No. 10-2015-0174283 (15 pages in Korean).

* cited by examiner

SINGLE ANTENNA-BASED WIRELESS CHARGING AND NEAR-FIELD COMMUNICATION CONTROL APPARATUS AND USER TERMINAL THEREFOR

CROSS REFERENCE TO RELATED APPLICATIONS

This application is a U.S. National Stage Application of International Application No. PCT/KR2016/012418, filed on Nov. 1, 2016, which claims the benefit under 35 USC 119(a) and 365(b) of Korean Patent Application No. 10-2015-0160684, filed on Nov. 16, 2015 and of Korean Patent Application No. 10-2015-0174283, filed on Dec. 8, 2015 in the Korean Intellectual Property Office.

TECHNICAL FIELD

The present invention relates to a technology for wireless charging and short-range wireless communication.

BACKGROUND ART

A short-range communication module that performs a communication by forming a magnetic field in a frequency band of several to tens of MHz is used in a radio frequency identification (hereinafter, referred to as an RFID) module, a near field communication (hereinafter, referred to as an NFC) module, and the like. In particular, various applications using the NFC method are used in portable terminals, such as smart phones, and are gaining popularity as an auxiliary payment device.

Meanwhile, there is a method of wireless charging using magnetic resonance. As a representative magnetic resonance wireless power transfer standard, the Alliance for Wireless Power (hereinafter, referred to as A4WP) method uses an industrial, scientific, and medical (ISM) frequency band of 6.78 MHz, which corresponds to half of an ISM frequency band (13.56 MHz) of an NFC module. In order to receive A4WP power, an additional A4WP antenna is needed, and a resonator configured with the A4WP antenna is set to resonate at a frequency of 6.78 MHz. In comparison, the NFC module performs communication at a 13.56 MHz ISM frequency band, and needs to be provided with an NFC antenna for wireless communication and a resonator that generates a resonance at a frequency of 13.56 MHz.

Technical Problem

The present invention is directed to providing a single antenna-based wireless charging and near-field communication control apparatus, capable of performing wireless charging and short-range communication by using a single antenna, and a user terminal therefor.

Technical Solution

One aspect of the present invention provides an apparatus for controlling wireless charging and short-range communication on the basis of a single antenna, the apparatus including: a switch controller configured to detect a resonance frequency from a rectifier input signal of a power receiving unit, determine whether the detected resonance frequency is a first frequency for performing wireless charging using a single antenna or a second frequency for performing short-range communication using the single antenna, and generate a control signal; and a switch configured to be turned on or off according to the control signal received from the switch controller in order to perform wireless charging or short-range communication.

The switch controller may be configured to: confirm a wireless chargeable state when the detected resonance frequency is the first frequency and generate a driving signal of a high level to turn the switch on, to block power from being supplied to a short-range communication module, and protect the short-range communication module; and confirm a short-range communicable state when the detected resonance frequency is the second frequency and generate a driving signal of a low level to turn the switch off in order to operate the short-range communication module.

The power receiving unit may transmit or receive a wireless power signal to or from a power transmitting unit using an Alliance for Wireless Power (A4WP) method. The short-range communication may be a near field communication (NFC) or radio frequency identification (RFID) communication. The first frequency for wireless charging may be 6.78 MHz, and the second frequency for short-range communication may be 13.56 MHz.

The switch may have a source connected to a ground voltage, a drain connected to a short-range communication module, and a gate to which a driving voltage is input from the switch controller. The switch may include: a first switch having a source connected to a first ground voltage, a drain connected to a short-range communication module, and a gate to which a first driving voltage is input from the switch controller; and a second switch having a source connected to a second ground voltage, a drain connected to the short-range communication module, and a gate to which a second driving voltage is input from the switch controller, wherein the short-range communication module receives differential input signals and the switch controller receives differential input signals.

Another aspect of the present invention provides a user terminal including: a resonator including a single antenna for wireless power signal reception and short-range communication; a power receiving unit configured to receive a wireless power signal using a first frequency signal that is resonated by the resonator; a short-range communication module configured to perform wireless communication using a second frequency signal that is resonated by the resonator; a switch controller configured to detect a resonance frequency from a rectifier input signal of the power receiving unit, determine whether the detected resonance frequency is a first frequency or a second frequency, and generate a control signal; and a switch configured to be turned on or off according to the control signal received from the switch controller to perform wireless charging or short-range communication.

The resonator may include an antenna and a third capacitor connected in series and further includes a first capacitor and a second capacitor to form a resonance tank, wherein the first capacitor may be connected in series to the second capacitor and may be connected in parallel to the antenna, and the second capacitor may be connected in series to the first capacitor and may be connected in parallel to the antenna, and a connection node between the first capacitor and the antenna may be provided with a ground voltage, a connection node between the second capacitor and the first capacitor may be connected to an input of the power receiving unit, and a connection node between the third capacitor and the switch may be connected to an input of the short-range communication module.

The switch controller may be configured to: confirm a wireless chargeable state when the detected resonance frequency is the first frequency and generate a driving signal of a high level to turn the switch on, to block power from being supplied to the short-range communication module and protect the short-range communication module; and confirm a short-range communicable state when the detected resonance frequency is the second frequency and generate a driving signal of a low level to turn the switch off in order to operate the short-range communication module.

Advantageous Effects

According to the present invention, wireless charging and a short-range wireless communication can be performed using a single antenna, rather than using separate antennas for wireless charging and short-range wireless communication. In addition, when a great amount of power is supplied from a power transmitting unit for wireless charging to a power receiving unit, power is blocked from being excessively supplied to a short-range communication module that is configured to transmit and receive lower power, thereby preventing the short-range communication module from being broken due to excessive power and protecting the short-range communication module.

MODES OF THE INVENTION

Hereinafter, embodiments of the present invention will be described in detail with reference to the accompanying drawings. In the description of the embodiments, the detailed description of related known functions or constructions will be omitted herein to avoid making the subject matter of the present invention unclear. In addition, terms which will be described below are defined in consideration of functions in the embodiments of the present invention and may vary with an intention of a user, an operator, or a custom. Accordingly, the definition of the terms should be determined based on overall contents of the specification.

The present invention is a control technology for implementing a power receiving unit (hereinafter, referred to as a PRU) that receives power from a power transmitting unit (hereinafter, referred to as a PTU) for wireless charging and a short-range communication module that performs a short-range wireless communication by using a single antenna. In this case, when power is supplied from the PTU for wireless charging, a power signal is prevented from being supplied to the short-range communication module, thereby protecting the short-range communication module.

The short-range communication module according to an embodiment may refer to all types of communication modules that transmit and receive a wireless signal in a magnetic field, for example, a near field communication (hereinafter, referred to as an NFC) module or radio frequency identification (hereinafter, referred to as an RFID) module. The short-range communication module performs a short-range wireless communication in a frequency band of several to tens of MHz, and an NFC module, for example, may transmit or receive a wireless signal at a frequency band of 13.56 MHz.

The PTU and PRU according to the embodiment use the Alliance for Wireless Power (hereinafter, referred to as an A4WP) method. According to the A4WP method, an A4WP PTU supplies a power signal to an A4WP PRU through a magnetic resonance at a frequency band of 6.78 MHz. However, the wireless charging method is not limited to the A4WP method. For example, a Qi method owned by the Wireless Power Consortium (WPC) and a Power Matters Alliance (PMA) method that are used in low-frequency bands are available. In addition, when wireless charging, even that which does not conform to the A4WP method, is performed at a frequency band different from that at which short-range wireless communication is performed, for example, when wireless charging is performed at a frequency of 4 MHz, an NFC module of a frequency band of 13.56 MHz and other short-range communication modules in frequency bands around 13.56 MHz may be protected.

Hereinafter, for convenience sake, an NFC module, an A4WP PTU, and an A4WP PRU are taken as examples of the short communication module, the power transmitting unit, and the power receiving unit respectively in the following description, but the present invention is not limited thereto.

Figure 1:
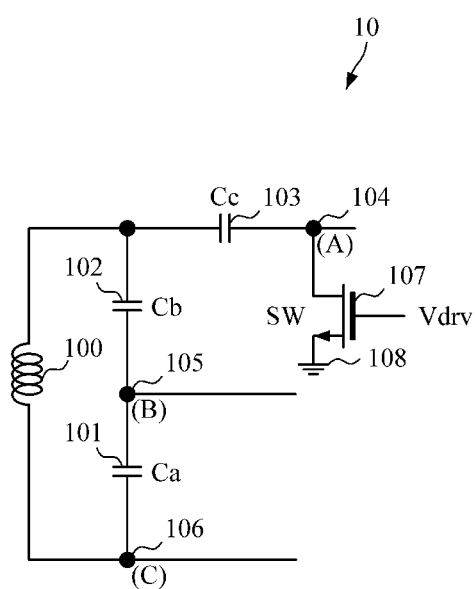
FIG. 1 is a circuit diagram illustrating a resonator according to an embodiment of the present invention.

FIG. 1 is a circuit diagram illustrating a resonator according to an embodiment of the present invention.

Referring to FIG. 1, a resonator 10 includes an antenna 100 and a third capacitor Cc 103 connected in series and further includes a first capacitor Ca 101 and a second capacitor Cb 102 to form a resonance tank. The first capacitor Ca 101 is connected in series to the second capacitor Cb 102 and is connected in parallel to the antenna 100. The second capacitor Cb 102 is connected in series to the first capacitor Ca 101 and is connected in parallel to the antenna 100.

The antenna 100 is a single antenna which supports both an A4WP wireless charging mode and a short-range communication mode. For example, the A4WP PRU may receive a wireless power signal from the A4WP PTU through magnetic resonance of the resonator 10 including the antenna 100. In addition, the NFC module may perform a wireless communication with an opposing NFC module in a magnetic field of the resonator 10 including the antenna 100.

A switch SW 107 has a source connected to a ground voltage 108, a drain connected to the third capacitor Cc 103, and a gate to which a driving voltage Vdrv is input. The switch SW 107 is turned on when the driving voltage Vdrv is a predetermined threshold voltage or higher, and is turned off when the driving voltage Vdrv is less than or equal to the predetermined threshold voltage.

Node (A) 104 in FIG. 1 is used as an input of the NFC module, Node (B) 105 in FIG. 1 is used as an input of the A4WP PRU, and Node (C) 106 in FIG. 1 is provided with a ground voltage. When the driving voltage Vdrv is set to be less than to the threshold voltage of the switch SW 107 in the above configuration, an equivalent circuit is formed as shown in FIG. 2.

Figure 2:
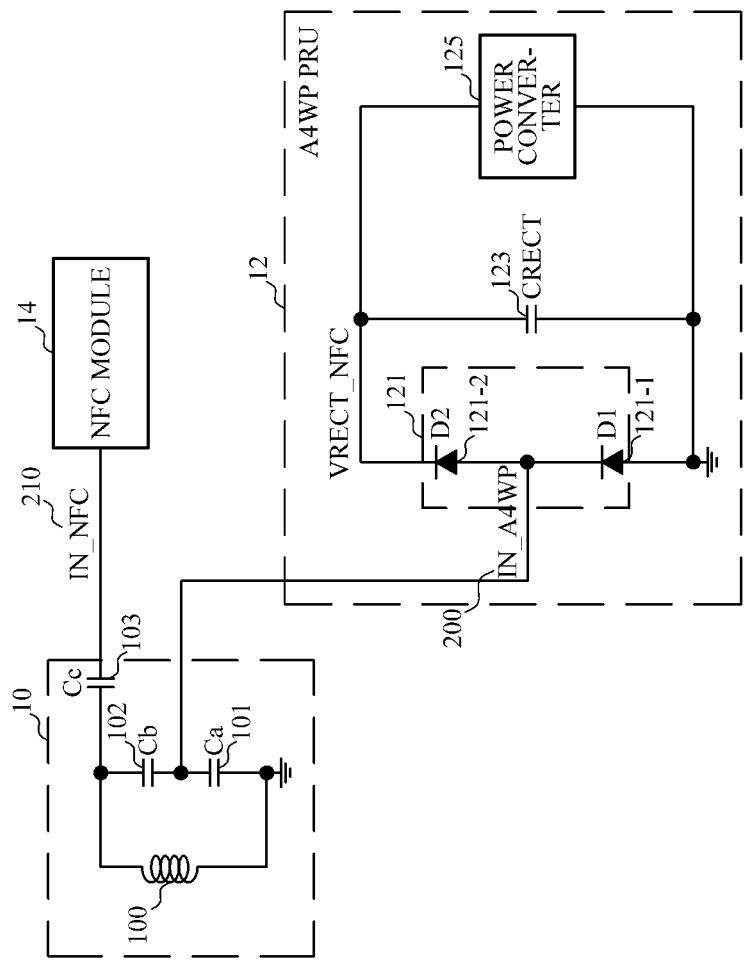
FIG. 2 is a circuit diagram illustrating operation of an NFC module when a switch is turned off according to an embodiment of the present invention.

FIG. 2 is a circuit diagram illustrating operation of the NFC module when the switch is turned off according to the embodiment of the present invention.

Referring to FIGS. 1 and 2, a rectifier 121 is connected to an output of the resonator 10 and receives an input voltage IN_A4WP 200 in the form of an alternating current (AC) and outputs an output voltage VRECT_A4WP in the form of a direct current (DC). The rectifier 121 includes at least one diode, for example, diodes D1 121-1 and D2 121-2, as shown in FIG. 2. A rectifier capacitor CRECT 123 smooths the rectifier output voltage VRECT_A4WP. The rectifier output voltage VRECT_A4WP allows a constant voltage to be supplied to a load through a power converter 125. The power converter 125 may be a DC-to-DC converter, a low drop-out regulator (LDO), or the like.

FIG. 2 illustrates a state in which the NFC module 14 operates in response to the switch SW 107 being turned off. Since a level of a voltage IN_NFC 210 input to the NFC module 14 is controlled to be 5 V or lower by the NFC module 14, the input voltage IN_A4WP 200 of the A4WP is 5 V or lower. In general, an A4WP PRU 12 is set to be operated by a rectifier output voltage VRECT_A4WP of 5 V or higher. Since a terminal having a charging battery is supplied with the rectifier output voltage VRECT_A4WP, and in most cases, the battery voltage is 3 V or higher, the output voltage VRECT_A4WP needs to be sufficiently greater than at least the battery voltage. Referring to FIG. 2, the input voltage IN_A4WP 200 of the A4WP is 5 V or lower, and thus the A4WP PRU 12 does not perform a normal operation. Accordingly, almost no current is introduced to the input voltage IN_A4WP 200 of the A4WP. When the inductance of the antenna 100 is L, the resonance frequency of the resonator 10 is determined as shown in Equation 1.

$$f_{NFC} = \frac{1}{2\pi\sqrt{L\left(Cc + \frac{Ca \cdot Cb}{Ca + Cb}\right)}} \quad \text{[Equation 1]}$$

Figure 3:
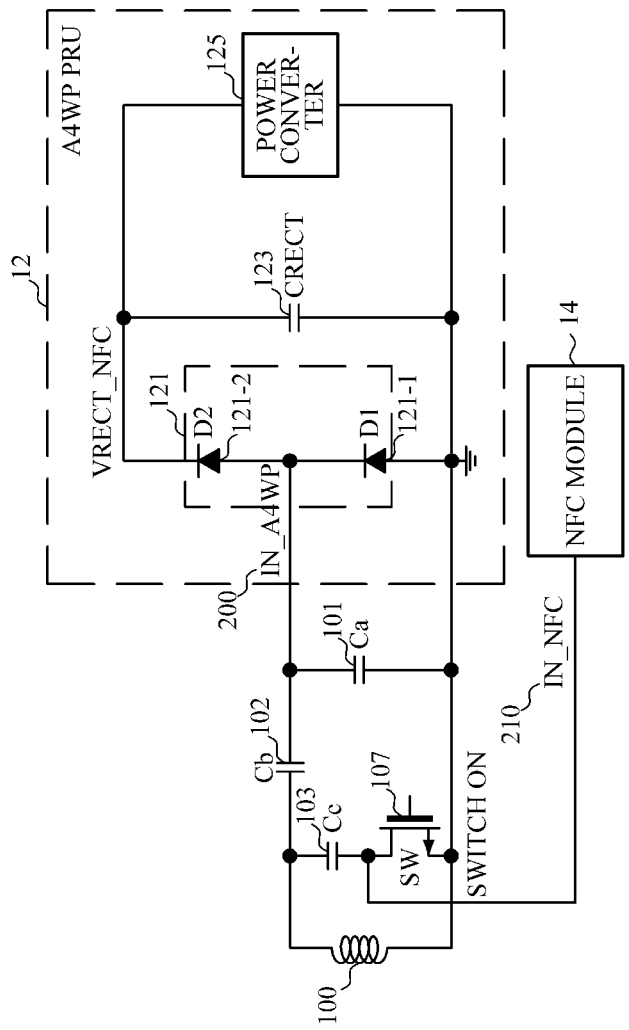
FIG. 3 is a circuit diagram illustrating operation of an A4WP PRU when a switch is turned on according to an embodiment of the present invention.

FIG. 3 is a circuit diagram illustrating operation of the A4WP PRU when the switch is turned on according to the embodiment of the present invention.

Referring to FIGS. 1 and 3, when the driving voltage Vdrv of the switch SW 107 is increased to the threshold voltage or higher, the switch SW 107 is turned on, thus allowing the A4WP PRU 12 to operate as shown in FIG. 3. In this case, the switch SW 107 allows the input voltage IN_NFC 210 of the NFC to become almost equal to the ground voltage, and thus a signal input to the NFC module 14 disappears and the NFC module 14 does not operate. Accordingly, the NFC module 14 is prevented from being broken by energy received by the antenna 100 when the A4WP PRU 12 operates. In addition, since the input voltage IN_NFC 210 of the NFC has a low voltage swing, the switch SW 107 may use a low voltage element using less than 5 V.

The resonance frequency of the resonator 10 is determined as shown in Equation 2.

$$f_{A4WP} = \frac{1}{2\pi\sqrt{L(Cc + Cb)}} \quad \text{[Equation 2]}$$

When the user terminal operates as the A4WP PRU 12, the resonance frequency needs to be two times lower than the NFC frequency, and thus needs to satisfy Equation 3 below.

$$\frac{f_{A4WP}}{f_{NFC}} = \frac{1}{2} = \frac{\sqrt{L\left(Cc + \frac{Ca \cdot Cb}{Ca + Cb}\right)}}{\sqrt{L(Cc + Cb)}} = \frac{\sqrt{Cc + \frac{Ca \cdot Cb}{Ca + Cb}}}{Cc + Cb} \quad \text{[Equation 3]}$$

Assuming that the first capacitor Ca 101 has a capacitance of n times higher than that of the second capacitor Cb 102, a condition as shown in Equation 4 is obtained.

$$Cc = \frac{1}{3}\frac{1 - 3n}{n + 1}Cb \quad \text{[Equation 4]}$$

The capacitance of the third capacitor Cc 103 needs to be a positive value and thus needs to satisfy a condition n<⅓. When n<⅓, the capacitance is expressed as follows.

Capacitance: $Ca = Cb/5$, $Cc = \frac{1}{9}Cb$

When the user terminal operates as the A4WP PRU 12, excessive power is blocked from being supplied to the NFC module, which is configured to transmit and receive lower power, thereby preventing the NFC module from being broken and protecting the NFC module.

Figure 4:
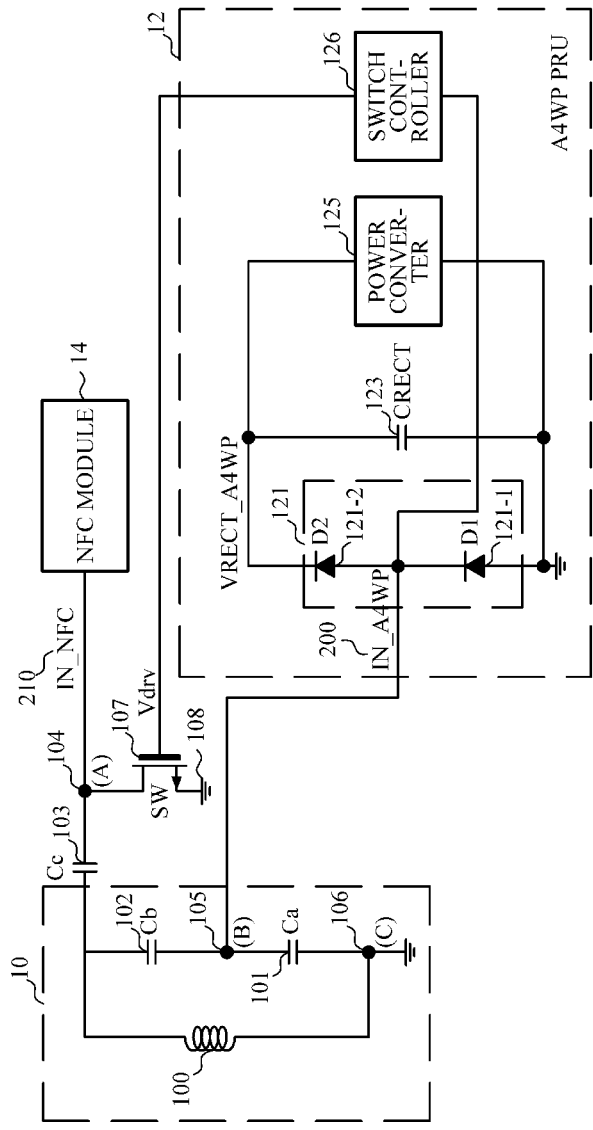
FIG. 4 is a circuit diagram illustrating a user terminal in which an NFC module and an A4WP PRU are operable using a single antenna according to an embodiment of the present invention.

FIG. 4 is a circuit diagram of the user terminal in which the NFC module and the A4WP PRU are operable using a single antenna according to the embodiment of the present invention.

Referring to FIG. 4, the user terminal includes the resonator including a single antenna 100, the A4WP PRU 12, and the NFC module 14. The A4WP PRU 12 includes the rectifier 121, the power converter 125, and an apparatus for controlling wireless charging and short-range communication. The apparatus for controlling wireless charging and short-range communication includes a switch controller 126 and the switch SW 107.

The user terminal may be a portable terminal that may be carried by a user. The single antenna 100 may perform wireless power signal reception and short-range communication. The A4WP PRU 12 receives a wireless power signal at a first resonance frequency at which the resonator 10 including the antenna 100 is resonated. The NFC module 14 performs wireless communication with an opposing NFC module at a second resonance frequency at which the resonator 10 including the antenna 100 is resonated.

The switch controller 126 detects a resonance frequency from an input voltage IN_A4WP 200 of the A4WP, determines whether the detected resonance frequency is a first frequency or a second frequency, and generates a control signal. The switch SW 107 is turned on or off to operate in a wireless charging mode or a short-range communication mode according to the control signal received from the switch controller 126.

The switch controller 126 according to the embodiment receives the input voltage IN_A4WP 200 of the A4WP, and when a resonance frequency is detected as 6.78 MHz, confirms a wireless chargeable state and generates a driving signal Vdrv of a high level to turn the switch SW 107 on, to block power from being supplied to the NFC module 14, and protect the NFC module 14. Meanwhile, the switch controller 126 confirms a short-range communicable state when the input voltage IN_A4WP 200 of the A4WP is 13.56 MHz and generates a driving signal Vdrv of a low level to turn the switch SW 107 off in order to operate the NFC module 14.

The switch SW 107 is provided as a MOSFET device, but may be provided using electrically controllable switch devices, for example, not only a BJT device, a GaN device, or a SiC device, but also a relay, a micro electro mechanical systems (MSMS) switch or the like that includes an electromagnet.

Figure 5:
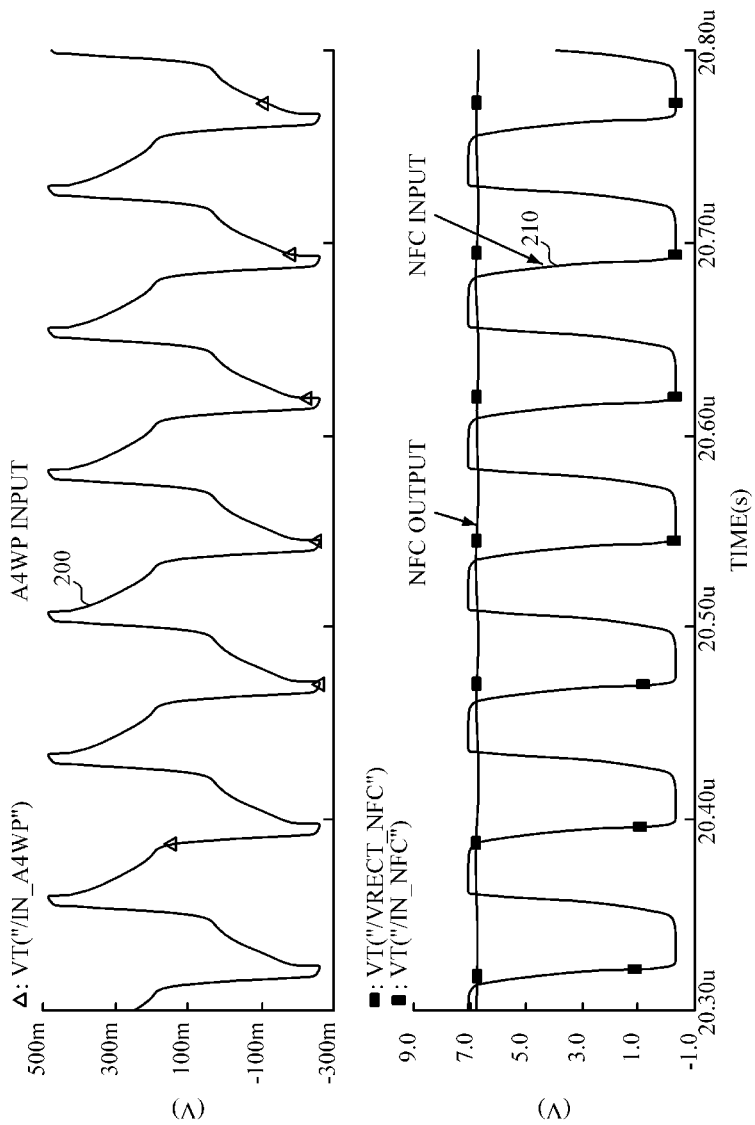
FIG. 5 is a waveform chart illustrating a simulation result of the NFC module operated by receiving energy transmitted by an NFC transmitting unit according to the embodiment of the present invention.

FIG. 5 is a waveform chart illustrating a simulation result of the NFC module operated by receiving energy transmitted by an NFC transmitting unit according to the embodiment of the present invention.

Referring to FIGS. 2 and 5, an NFC transmitting unit supplies energy at a frequency of 13.56 MHz, and the antenna of the terminal receives the energy and supplies the received energy to the NFC module 14. Referring to FIG. 5, the input voltage IN_NFC 210 of the NFC has a voltage swing having a peak of 7 V, but the input voltage IN_A4WP 200 of the A4WP is only about 500 mV. As a result, the A4WP PRU 12 does not operate, and thus most of the energy from the antenna is supplied to the NFC module 14.

Figure 6:
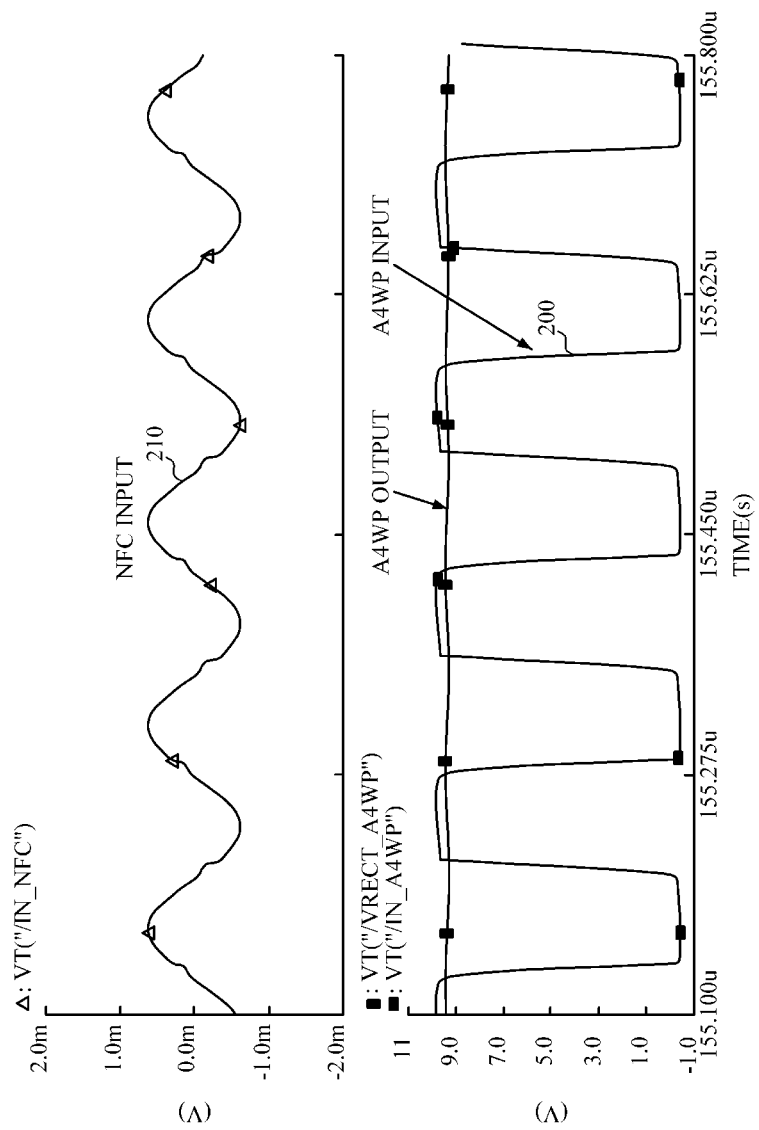
FIG. 6 is a waveform chart illustrating a simulation result of the A4WP PRU operated by receiving energy transmitted by an A4WP PTU according to the embodiment of the present invention.

FIG. 6 is a waveform chart illustrating a simulation result of the A4WP PRU operated by receiving energy transmitted by the A4WP PTU according to the embodiment of the present invention.

Referring to FIGS. 3 and 6, in a state in which the switch SW 107 is turned on such that the A4WP PRU 12 operates, the input voltage IN_A4WP 200 of the A4WP has a frequency of 6.78 MHz. In this case, the input voltage IN_NFC 210 of the NFC is almost zero. As a result, the NFC module 14 does not operate, and thus the NFC module 14 is protected.

Figure 7:
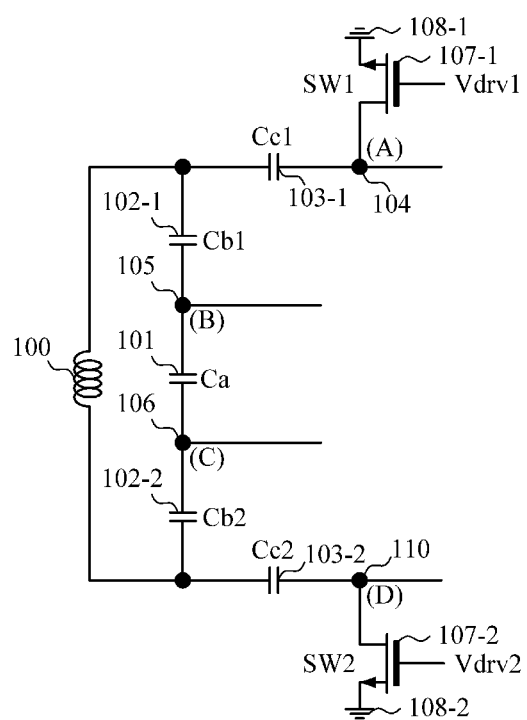
FIG. 7 is a circuit diagram illustrating a resonator according to another embodiment of the present invention.

FIG. 7 is a circuit diagram of a resonator according to another embodiment of the present invention.

The resonator described with reference to FIG. 1 is suitable for a single input. When two inputs having a differential form are needed, a resonance illustrated in FIG. 7 may be used. A user terminal constructed using the resonance is shown in FIG. 8.

Referring to FIG. 7, the resonator includes an antenna 100, a first capacitor Ca 101, second capacitors Cb1 and Cb2, i.e., 102-1 and 101-2, and third capacitors Cc1 and Cc2, i.e., 103-1 and 103-2. A first switch SW1 107-1 has a source connected to a first ground voltage 108-1, a drain connected to the third capacitor Cc1 103-1, and a gate to which a first driving voltage Vdrv1 is input. The first switch SW1 107-1 is turned on when the first driving voltage Vdrv1 is a predetermined threshold voltage or higher, and is turned off when the first driving voltage Vdrv1 is less than or equal to the predetermined threshold voltage. A second switch SW2, i.e., 107-2, has a source connected to a second ground voltage 108-2, a drain connected to the third capacitor Cc2 103-2, and a gate to which a second driving voltage Vdrv2 is input. The second switch SW2, i.e., 107-2, is turned on when the second driving voltage Vdrv2 is a predetermined threshold voltage or higher, and is turned off when the second driving voltage Vdrv2 is less than the predetermined threshold voltage.

Node (A) 104 in FIG. 7 is used as an input of an NFC module, Node (B) 105 in FIG. 7 is used as an input of an A4WP PRU, Node (C) 106 in FIG. 7 is used as an input of the A4WP PRU, and Node (D) 110 in FIG. 7 is connected to the second switch SW, i.e., 107-2.

Figure 8:
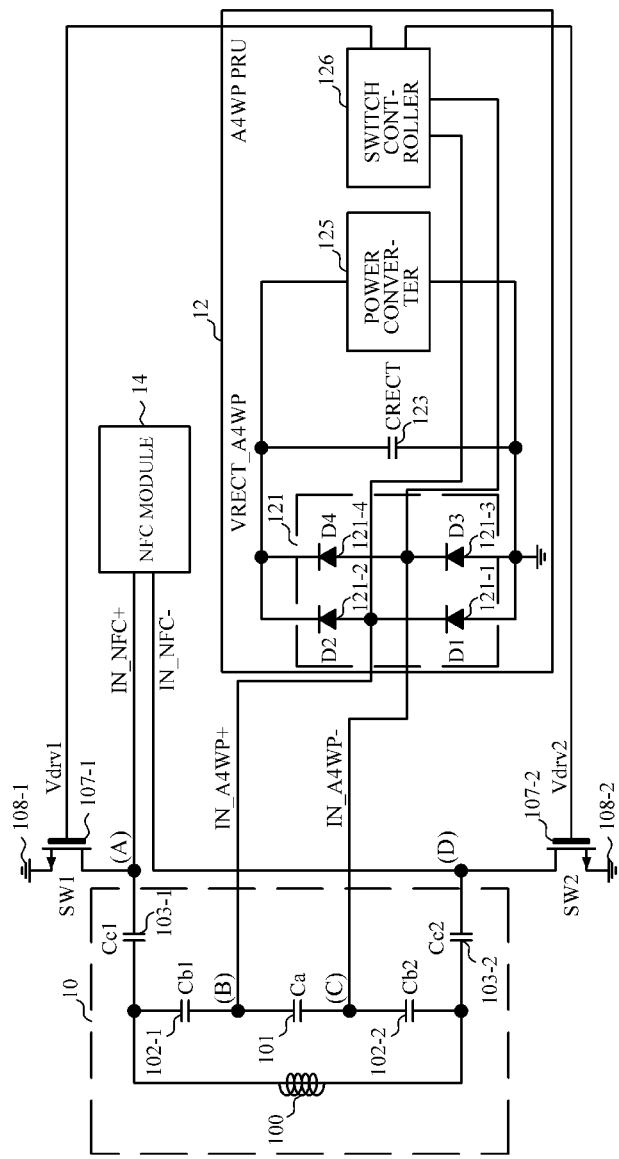
FIG. 8 is a circuit diagram illustrating a user terminal in which an NFC module and an A4WP PRU are operable using a single antenna according to another embodiment of the present invention.

FIG. 8 is a circuit diagram of the user terminal in which the NFC module and the A4WP PRU are operable using a single antenna according to another embodiment of the present invention.

Referring to FIG. 8, the NFC module 14 and the A4WP PRU 12 are implemented using the resonance suitable for a differential structure. The resonance frequency of the NFC module 14 is adjusted as shown in Equation 5. It is assumed that Cb1=Cb2=Cb, Cc1=Cc2=Cc $$f_{NFC} = \frac{1}{2\pi \sqrt{L\left(\frac{Cc}{2} + \frac{0.5Ca \cdot Cb}{Ca + 0.5Cb}\right)}} \quad \text{[Equation 5]}$$

When the user terminal operates as the A4WP PRU 12, the resonance frequency is expressed as shown in Equation 6.

$$f_{A4WP} = \frac{1}{2\pi\sqrt{0.5L(Cc + Cb)}} \quad \text{[Equation 6]}$$

The A4WP PRU 12 includes a rectifier 121, a power converter 125, and a switch controller 126. The rectifier 121 includes at least one diode, for example, diodes D1, D2, D3, and D4, i.e., 121-1, 121-2, 121-3, and 121-4, as shown in FIG. 8. The rectifier capacitor CRECT 123 smooths a rectifier output voltage VRECT_A4WP. The rectifier output voltage VRECT_A4WP allows a constant voltage to be supplied to a load through the power converter 125. The power converter 125 may be a DC-to-DC converter, an LDO, or the like.

The first switch SW1 107-1 has the source connected to the first ground voltage 108-1, the drain connected to the NFC module 14, and the gate to which the first driving voltage Vdrv 1 is input from the switch controller 126. The second switch SW2 107-2 has the source connected to the second ground voltage 108-2, the drain connected to the NFC module 14, and the gate to which the second driving voltage Vdrv2 is input from the switch controller 126. The NFC module 14 receives differential NFC input signals IN_NFC+ and IN_NFC−, and the switch controller 126 receives differential A4WP input signals IN_A4WP+ and IN_A4WP−.

The first switch SW1 107-1 and the second switch SW2 107-2 are provided using a MOSFET device, but may be provided using electrically controllable switch devices, for example, not only a BJT device, a GaN device, or a SiC device, but also a relay, a MSMS switch or the like that includes an electromagnet.

Although the exemplary embodiments of the present invention have been described for illustrative purposes, those skilled in the art should appreciate that various modifications, additions, and substitutions are possible without departing from the scope and spirit of the present invention. Therefore, the exemplary embodiments of the present invention have been described for illustrative purposes and not for limiting purposes. Accordingly, the scope of the present invention is not to be limited by the above embodiments but by the claims and the equivalents thereof.

The invention claimed is:

1. An apparatus for controlling wireless charging and short-range communication on the basis of a single antenna, the apparatus comprising:
a switch controller configured to:
detect a resonance frequency from a rectifier input signal of a power receiving unit,
determine whether the detected resonance frequency is a first frequency for performing wireless charging using a single antenna or a second frequency for performing short-range communication using the single antenna, and
generate a control signal; and
a switch configured to be turned on or off according to the control signal received from the switch controller in order to perform wireless charging or short-range communication,
wherein the switch has a source connected to a ground voltage, a drain connected to a short-range communication module, and a gate to which a driving voltage is input from the switch controller.

2. The apparatus of claim 1, wherein the switch controller is configured to:
confirm a wireless chargeable state when the detected resonance frequency is the first frequency and generate a driving signal of a high level to turn the switch on, to block power from being supplied to a short-range communication module, and protect the short-range communication module; and
confirm a short-range communicable state when the detected resonance frequency is the second frequency and generate a driving signal of a low level to turn the switch off in order to operate the short-range communication module.

3. The apparatus of claim 1, wherein the power receiving unit transmits or receives a wireless power signal to or from a power transmitting unit using an Alliance for Wireless Power (A4WP) method.

4. The apparatus of claim 1, wherein the short-range communication is a near field communication (NFC) or radio frequency identification (RFID) communication.

5. The apparatus of claim 1, wherein the first frequency for wireless charging is 6.78 MHz, and the second frequency for short-range communication is 13.56 MHz.

6. A user terminal comprising:
a resonator including a single antenna for wireless power signal reception and short-range communication;
a power receiving unit configured to receive a wireless power signal using a first frequency signal that is resonated by the resonator;
a short-range communication module configured to perform wireless communication using a second frequency signal that is resonated by the resonator;
a switch controller configured to detect a resonance frequency from a rectifier input signal of the power receiving unit, determine whether the detected resonance frequency is a first frequency or a second frequency, and generate a control signal; and
a switch configured to be turned on or off according to the control signal received from the switch controller to perform wireless charging or short-range communication,
wherein:
the resonator includes an antenna and a third capacitor connected in series and further includes a first capacitor and a second capacitor to form a resonance tank, wherein the first capacitor is connected in series to the second capacitor and is connected in parallel to the antenna, and the second capacitor is connected in series to the first capacitor and is connected in parallel to the antenna; and
a connection node between the first capacitor and the antenna is provided with a ground voltage, a connection node between the second capacitor and the first capacitor is connected to an input of the power receiving unit, and a connection node between the third capacitor and the switch is connected to an input of the short-range communication module.

7. The user terminal of claim 6, wherein the switch controller is configured to:
confirm a wireless chargeable state when the detected resonance frequency is the first frequency and generate a driving signal of a high level to turn the switch on, to block power from being supplied to the short-range communication module and protect the short-range communication module; and
confirm a short-range communicable state when the detected resonance frequency is the second frequency and generate a driving signal of a low level to turn the switch off in order to operate the short-range communication module.

* * * * *